United States Patent Office 3,845,142
Patented Oct. 29, 1974

3,845,142
PROCESS FOR PRODUCING POLYCYCLIC ALKYLPHENOLS
Yakov Abramovich Gurvich, Sretensky bulvar 6, kv. 61; Alexandr Afroimovich Grinberg, Khalturinskaya ulitsa 10, korpus 2, kv. 30; Evgeny Lvovich Styskin, Khalturinskaya ulitsa 10, korpus 2, kv. 48; Simona Tevievna Kumok, Kutuzovsky prospekt 41, korpus 1, kv. 32; Valerian Mikhailovich Sobolev, Naberezhnaya Maxima Gorkogo 12, kv. 62; Eduard Sergeevich Sorokin, ulitsa Boitsova 16, korpus 1, kv. 62; and Irina Sergeevna Shelkova, Rostovsky pereulok 2/14, kv. 23, all of Moscow, U.S.S.R.; and Alexandr Grigorievich Liakumovich, Prospekt Lenina 23, kv. 4; Jury Ivanovich Michurov, ulitsa Khudaiberdova 125, kv. 36; and Grigory Iosifovich Rutman, ulitsa Revoljutsionnaya 7, kv. 6, all of Sterlitamak, U.S.S.R.
No Drawing. Filed Jan. 28, 1972, Ser. No. 221,826
Int. Cl. C07c 37/00
U.S. Cl. 260—619 B          7 Claims

ABSTRACT OF THE DISCLOSURE

A process for producing polycyclic alkylphenols comprising condensation of 2,6-di-tert.butyl-4-methoxymethylphenol with alkylsubstituted benzene derivatives. The reaction is carried out in an inert organic solvent medium in the presence of acidic catalysts at a temperature within the range of from −60 to +140° C. and at a ratio of 2,6-di-tert.butyl-4-methoxymethylphenol to an alkylsubstituted benzene derivative equal to 0.8–1.7 of the stoichiometric value. On completion of the reaction the desired product is isolated by conventional techniques such as crystallization.

The process of the present invention enables producing the desired product from available raw materials, namely 2,6-di-tert.-butyl-4-methoxymethylphenol, whereupon said desired products of a high purity are obtained with a yield of 80–82% based on the alkylbenzene.

The present invention relates to processes for the production of polycyclic alkylphenols which are useful as non-dyeing and non-volatile antioxidants for rubbers, gums, plastics, petroleum products, and other organic substances.

Known in the art is a process for producing polycyclic alkylphenols by condensation of 3,5-dialkyl-4-hydroxybenzyl alcohol with alkylsubstituted benzene derivatives such as mesitylene in an inert organic solvent medium in the presence of acidic catalysts at a temperature of from −60 to +140° C. followed by the isolation of the desired product (cf. U.S. Pat. No. 3,026,254; Cl. 260–459.5).

Said prior-art process has a disadvantage residing in rather limited availability of the starting phenol derivative such as 3,5-di-tert.butyl-4-hydroxybenzyl alcohol. Said alcohol is obtained from 2,6-di-tert.butylphenol with a yield of 30–50% of the theoretical value. Polycyclic alkylphenols are produced by condensation thereof with alkylbenzenes, the yield being 75–78% based on the alkylbenzene. Therefore, the yield of polycyclic alkylphenols based on 2,6-di-tert.butylphenol is only 25–40%. In addition, since 3,5-di-tert.butyl-4-hydroxybenzyl alcohol possesses high reactivity, various side reaction products are formed under the acid catalysts conditions.

It is an object of the present invention to provide such a process for producing polycyclic alkylphenols which would enable the production thereof from easily available raw materials.

It is another object of the present invention to provide such a process for producing polycyclic alkylphenols which would enable producing the desired products with a high yield.

Still another object of the present invention is to provide such a process which would enable producing the desired products of a high purity.

These and other objects of the present invention have been accomplished by effecting condensation of a phenol derivative, namely 2,6-di-tert.butyl - 4 - methoxymethylphenol, with alkylsubstituted benzene derivatives. The reaction is carried out in an inert organic solvent medium in the presence of acidic catalysts at a temperature within the range of from −60 to +140° C. and at a ratio of 2,6-di-tert.butyl-4-methoxymethylphenol to the alkylbenzene derivative equal to 0.8–1.7 of the stoichiometric value. On completion of the process the desired product is isolated by conventional techniques such as crystallization.

The 2,6-di-tert.butyl-4-methoxymethyl employed in the process according to the present invention is an easily available product. It is obtained from 2,6-di-tert.butylphenol in a simple manner, the yield being 83–87% of the theoretical value.

It has been found that in the presence of acidic catalysts 2,6-di-tert.butyl-4-methoxymethylphenol is involved in the electrophilic substitution reaction, attacking an alkylbenzene molecule and forming polycyclic alkylphenols with a yield of 80–82% based on the alkylbenzene. Therefore, the yield of polycyclic alkylphenols is 63–65% calculated on the basis of the 2,6-di-tert.butylphenol.

A less pronounced tendency of 2,6-di-tert.butyl-4-methoxymethylphenol to enter into side reactions enables producing the desired product possessing a high purity. Thus, the condensation product resulting from the reaction of said phenol derivative and mesitylene, namely 2,4,6-tris-(3,5 - di-tert.butyl-4-hydroxybenzyl)mesitylene, produced by the process of the present invention, has its melting point of 238–239° C.; the same product produced by the prior art process has a 201–203° C. melting point and requires double recrystallization in order to attain the 238–239° C. melting point.

The process for producing polycyclic alkylphenols according to the present invention may be embodied in the following way.

An inert organic solvent, e.g., methylene chloride, dichloroethane, carbon tetrachloride, is charged into a reaction vessel provided with a stirrer, along with 2,6-di-tert.butyl-4-methoxymethylphenol and an alkylbenzene, e.g., durol, mesitylene, isomeric xylene and ethylbenzene. The reactor contents are stirred, whereafter an acidic catalyst such as sulphuric acid, phosphoric acid, chloric acid, oxalic acid arylsulphonic acid, and zinc chloride, is added thereto. After the catalyst addition the reaction mixture is stirred for 30–180 minutes. The temperature in the reactor is maintained within the range of from −60 to +140° C. In some cases the catalyst is charged into the reactor simultaneously with the other above-mentioned reactants. On completion of the reaction the desired product is isolated by conventional techniques, for instance by crystallization.

For better understanding of the present invention reference will now be made to the following examples of the process for the production of polycyclic phenols.

EXAMPLE 1

100 ml. of methylene chloride, 25 g. of 2,6-di-tert.butyl-4-methoxymethylphenol and 3 g. of mesitylene are charged into a flask provided with a stirrer, thermometer, and cooling bath. The mixture is cooled to a temperature of from 1 to 5° C. with stirring and 9.1 g. of 94% sulphuric acid is added thereto. On completion of charging the flask contents is stirred for 30 minutes, whereafter the organic layer is separated from the acidic one, neutralized with soda to give 2,4,6-tris-(3,5-di-tert.butyl-4-hydroxybenzene)mesitylene isolated by crystallization.

The desired product is obtained in the amount of 15.5 g., its melting point is 238–239°.

EXAMPLE 2

100 ml. of dichloroethane, 25 g. of 2,6-di-tert.butyl-4-methoxymethylphenol and 5 g. of durol are charged into a flask provided with a stirrer, thermometer, and cooling bath. The mixture is cooled to 0° C. with stirring, whereafter 9 g. of sulphuric acid is added thereto. The subsequent treatment of the reaction mixture is carried out under conditions of Example 1.

The desired product, namely 1,4-bis-(3,5-di-tert.butyl-4-hydroxybenzyl)durol having its melting point of 194–195° C. is obtained in the amount of 17.2 g.

EXAMPLE 3

25 g. of 2,6-di-tert.butyl-4-methoxymethylphenol, 3 g. of mesitylene and 100 ml. of dichloroethane are charged into a flask provided with a stirrer, thermometer, and dropping funnel. 9.1 g. of 94% sulphuric acid are charged into the flask at a temperature of 25–30° C. for 30 minutes with stirring. On completion of the reactant addition the reaction mixture is stirred at this temperature for additional 1.5 hours, whereafter the organic layer is separated from the acidic one, neutralized with an alkali to yield 2,4,6 - tris-(3,5-di-tert.butyl-4-hydroxybenzyl)mesitylene isolated by crystallization.

The desired product having a 237–239° C. melting point is obtained in the amount of 14.2 g.

EXAMPLE 4

25 g. of 2,6-di-tert.butyl-4-methoxymethylphenol, 3 g. mesitylene, and 100 ml. of methylene chloride are charged into a flask provided with a stirrer, thermometer, reflux condenser dropping funnel, and cooling bath. The reaction mass is cooled to a temperature of −55 to −60° C. with stirring, whereafter 9.1 g. of 94% sulphuric acid are progressively added and the mixture is stirred for additional 60 minutes. Then the organic layer is separated from the acidic one, neutralized with calcium oxide to yield 2,4,6-tris-(3,5 - di-tert.butyl - 4 - hydroxybenzene) mesitylene isolated by crystallization. The desired product having a 238–239° C. melting point is obtained in the amount of 15.7 g.

EXAMPLE 5

20 g. of 2,6-di-tert.butyl-4-methoxymethylphenol, 3 g. of mesitylene, 100 ml. of chlorobenzene, and 20 g. of oxalic acid are charged into a flask provided with a stirrer, thermometer and reflux condenser. The reaction mass is heated to a temperature of 135–140° C. and stirred at this temperature for 3 hours. Then the organic layer is separated from the oxalic acid and the desired product is isolated by crystallization. 13.1 g. of a crystalline product which is a mixture of di- and tris-(3,5-di-tert.butyl-4-hydroxybenzene)mesitylene having a 152–154.5° C. melting point are thus obtained.

EXAMPLE 6

29.2 g. of 2,6-di-tert.butyl-4-methoxymethylphenol, 3 g. of mesitylene, and 100 ml. of carbon tetrachloride are charged into a flask provided with a stirrer, thermometer, dropping funnel, and cooling bath. The reaction mass is cooled to −5° C., whereafter 10 ml. of 70% chloric acid are progressively added thereto. Then the reaction mixture is stirred for 60 minutes, the organic layer is separated from the acidic one, neutralized with an alkali to yield 2,4,6-tris(3,5-di-tert.butyl - 4 - hydroxybenzyl)mesitylene isolated by crystallization.

15.6 g. of the desired product having a 238–239° C. melting point are thus obtained.

EXAMPLE 7

14 g. of 2,6-di-tert.butyl-4-methoxymethylphenol, 3 g. of mesitylene, 30 g. of para-toluenesulphonic acid, and 100 ml. of chlorobenzene are charged into a flask provided with a stirrer, thermometer, and reflux condenser. The reaction mass is heated to 60° C. and stirred at this temperature for 1.5 hours. Then the organic layer is separated from the acidic one, neutralized with soda, the desired product being isolated by crystallization.

10.2 g. of a crystalline product which is a mixture of di- and tris-(3,5 - di-tert.butyl-4-hydroxybenzene)mesitylene having a 151–154° C. melting point are obtained.

We claim:

1. A process for producing polycyclic alkylphenols, comprising condensation of 2,6-di-tert.butyl-4-methoxymethylphenol with a methylsubstituted benzene having from 1 to 4 methyl groups in an inert organic solvent medium in the presence of an acidic catalyst selected from the group consisting of sulfuric acid, oxalic acid, perchloric acid, toluenesulfonic acid, and zinc chloride, at a temperature of from −60° to +140° C. and at a ratio of the 2,6-di-tert.butyl-4-methoxymethylphenol to methylsubstituted benzene of 0.8–1.7 of the stoichiometric value, followed by the isolation of the desired product.

2. The process of Claim 1 wherein the catalyst is sulfuric acid.

3. The process of Claim 1 wherein the catalyst is oxalic acid.

4. The process of Claim 1 wherein the catalyst is perchloric acid.

5. The process of Claim 1 wherein the catalyst is toluenesulfonic acid.

6. The process of Claim 1 wherein the inert organic solvent is selected from the group consisting of methylene chloride, dichloroethane, chlorobenzene, and carbon tetrachloride.

7. The process of Claim 1 wherein the methyl-substituted benzene is selected from the group consisting of durol, mesitylene, and xylene.

References Cited

UNITED STATES PATENTS

| | | | |
|---|---|---|---|
| 3,026,264 | 3/1962 | Rocklin et al. | 260—619 B X |
| 3,047,503 | 7/1962 | Jaffe et al. | 260—619 B X |
| 3,052,728 | 9/1962 | Rocklin | 260—619 B |

FOREIGN PATENTS

| | | | |
|---|---|---|---|
| 1,910,793 | 9/1970 | Germany | 260—619 B |

BERNARD HELFIN, Primary Examiner

U.S. Cl. X.R.

252—404